2,789,147
PURIFICATION OF 2-BUTYNE-1,4-DIOL BY FRACTIONAL CRYSTALLIZATION

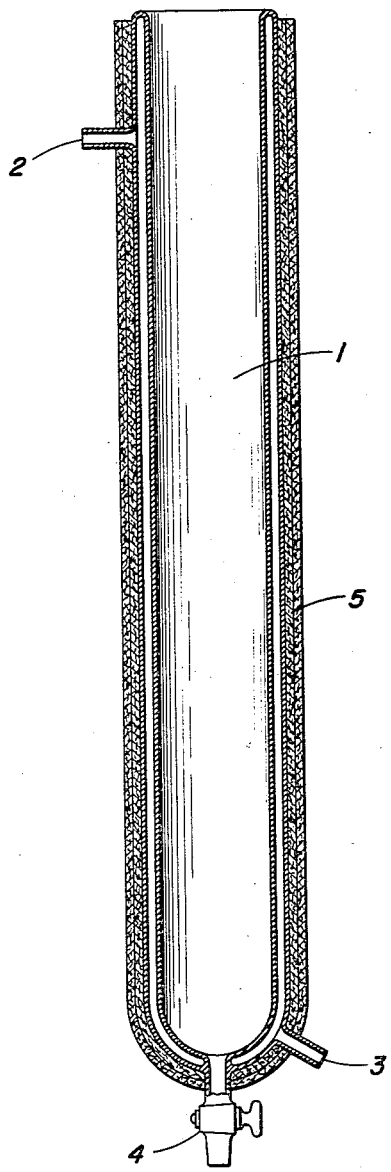
Albert Bloom
David E. Graham
INVENTORS

Albert Bloom, Summit, and David E. Graham, Winfield, N. J., assignors to General Aniline & Film Corporation, New York, N. Y., a corporation of Delaware Application December 9, 1954, Serial No. 474,102

4 Claims. (Cl. 260—637)

This invention relates to an improved process of purifying 2-butyne-1,4-diol.

2-butyne-1,4-diol is normally prepared by the reaction of formaldehyde with acetylene in the presence of a metal acetylide catalyst followed by a subsequent concentration which yields a mixture of by-products containing such compounds as propargyl alcohol, dipropargyl formal, propargyl aldehyde, dimethylpropargyl, mixed acetals and other compounds.

In order to isolate the 2-butyne-1,4-diol from the concentrate, it is necessary to subject the latter to vacuum distillation at a temperature ranging from 120 to 145° C. and from 2 to 7 mm. of pressure. The distillation of impure 2-butyne-1,4-diol is not without hazard, and an efficient fractionation column is required to effect a good separation of the impurities.

It is an object of the present invention to provide an economic, efficient and non-hazardous process for purifying solid 2-butyne-1,4-diol resulting from concentration of the reaction liquor without resorting to fractionation or distillation.

Other objects and advantages will become apparent from the following specification.

We have found that 2-butyne-1,4-diol can be purified to give a good yield of a material of high purity by subjecting the impure 2-butyne-1,4-diol, having a solidification point of 49° to 52° C. and a water content ranging from 1 to 4%, to a sweating operation. In this operation the crude 2-butyne-1,4-diol is slowly cooled from approximately its solidification point (49°–52° C.) to a temperature approximating the eutectic point, draining off the residual liquid phase from the crystal phase, then gradually raising the temperature to above 50° C., i. e. 52–55° C., while draining off the resulting liquid phase so as to leave substantially pure 2-butyne-1,4-diol behind as crystals. The type of apparatus employed for the sweating operation is immaterial. In fact, any type of apparatus whether vertical or horizontal tube or tank may be employed so long as it is provided with heating and cooling means together with an inlet and outlet. The method and the rate of heating and cooling are likewise immaterial and not essentially critical to the process; although optimum conditions do exist. These, however, are readily ascertainable by a few preliminary spot experiments. For purposes of illustrating the present invention, we have employed a vertical jacketed glass or metal tube provided with a drain cock at the bottom thereof.

For a clearer understanding of the invention reference is made to the accompanying drawing wherein such jacketed tube is illustrated. By reference thereto it will be noted that the jacketed tube 1 is provided with a water inlet 2, water outlet 3, and a drain cock 4. The jacketed tube is insulated with several layers of asbestos 5 so as to prevent heat loss. Water is circulated through the jacket by means of water inlet 2 from a thermostat bath by means of a high speed pump. The temperature of the thermostat bath is employed for controlling the temperature, and the temperature regulated to 0.2° C. The length and the inside diameter of the jacketed tube is immaterial. For laboratory purposes the length may range from ½ to 1½ inches. For larger scale, especially commercial operations, the length and the inside diameter may be increased five to tenfold. Multiple tubes on a manifold, such as sheet and tube construction may be used.

The following detailed example is given to illustrate the preferred method for carrying out the present invention. It is to be clearly understood that the precise details set forth are to be considered merely as illustrative and not limitative of the invention. All parts given are by weight.

Example 1

Into a vertical jacketed glass tube constructed as shown in the drawing and having an inside diameter of ¾ inch and a length of 24 inches, there were added 266 parts of impure 2-butyne-1,4-diol having a solidification point of 51.5° C. and containing 2.2% of water. The charge was made at 52° C. and seeded with a few crystals of pure 2-butyne-1,4-diol. Water was circulated through the jacket of the tube from a thermostat bath, not shown and which is of the usual type, so that the temperature could be regulated to 0.2° C. After seeding, the temperature of the water circulating through the jacketed glass tube was cooled to 40° C. at a rate of 1° C. per hour. When the temperature dropped to 51° C. additional crystals of 2-butyne-1,4-diol were added to insure proper seeding. The cooling was continued until the temperature of 40° C. was attained. At this point the cooling was continued to 19° C. at the rate of 2° C. per hour and held at 19° C. for a period of one hour. The pet cock was opened and the liquid in the tube allowed to drain away from the crystals. The draining was continued while heating to 45° C. at a rate of 2° C. per hour and from 45° to 49.5° C. at the rate of 1° C. per hour. The combined first drainings and drips to 49.5° C. were identified as Drip Oil #1. The receiver under the drain cock was changed and the tube heated to 54° C. at a rate of 1° C. per hour. These drainings were identified as Drip Oil #2. The drain cock was closed and the batch heated to melt (55–60° C.). When the product in the tube was melted it was drained. This is the main cut. The parts by weight and analyses of the two fractions as well as the main cut obtained are shown in the following table.

Table

| Fraction | Temp. Range, °C. | Parts by Weight | Percent of Charge | M. P., °C. | Percent H₂O | Light Absorption |
|---|---|---|---|---|---|---|
| Drip Oil No. 1 | 19–49.5 | 93.7 | 35.2 | 46.0–48.7 | 3.2 | |
| Drip Oil No. 2 | 49.5–54 | 74.9 | 28.3 | 49.2–51.8 | 1.9 | |
| Main Cut | | 97.4 | 36.6 | 55.7–57.9 | 0.59 | 10 |

The drip oil contains, in addition to water, small amounts of propargyl alcohol, dipropargyl formal, propargyl aldehyde, dimethylpropargyl, mixed acetals, and other compounds.

The presence of water was determined by the Karl Fischer determination, and the light absorption by the General Electric Luximeter.

Drip Oil 1 may be concentrated further and recycled to the freezing operation. Drip Oil 2 can be recycled directly to the freezing operation.

It is to be noted that it is not absolutely necessary to seed the charge of impure 2-butyne-1,4-diol with a few crystals of pure 2-butyne-1,4-diol. The sweating operation, however, does proceed a little better with seeding.

We claim:
1. The process of purifying 2-butyne-1,4-diol which comprises slowly cooling impure 2-butyne-1,4-diol from its approximate solidification point to a temperature at which most of the 2-butyne-1,4-diol is crystallized, draining the liquid from the crystals, continuing the draining of the liquid from the crystallized 2-butyne-1,4-diol while slowly raising the temperature to above 50° C. so as to leave behind substantially pure 2-butyne-1,4-diol.

2. The process according to claim 1 wherein the impure 2-butyne-1,4-diol has a solidification point of 49°–52° C. and a water content of 1.4%.

3. The process according to claim 1 wherein the cooling of the impure 2-butyne-1,4-diol is carried out in a vertical jacketed tube.

4. The process according to claim 1 wherein the cooling is carried out to a temperature below 40° C.

References Cited in the file of this patent

Tipson et al: U. S. Nat. Bur. Standards Journal of Research, vol. 32 (1944), pgs. 253–9.

Weissburger (Editor): Technique of Organic Chemistry, vol. III, Interscience (1950), pgs. 404, 405, 429.